(12) United States Patent
Brueck et al.

(10) Patent No.: US 8,547,918 B2
(45) Date of Patent: Oct. 1, 2013

(54) MULTIPLE-USER MULTIPLE-INPUT AND MULTIPLE-OUTPUT FOR HIGH-SPEED PACKET ACCESS SYSTEMS

(75) Inventors: Stefan Brueck, Nuremberg (DE); Josef J. Blanz, Forst (DE); Pavan Kumar Vitthaladevuni, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 360 days.

(21) Appl. No.: 12/947,602

(22) Filed: Nov. 16, 2010

(65) Prior Publication Data

US 2011/0280197 A1 Nov. 17, 2011

Related U.S. Application Data

(60) Provisional application No. 61/262,105, filed on Nov. 17, 2009.

(51) Int. Cl.
*H04W 4/00* (2009.01)
(52) U.S. Cl.
USPC ............................ 370/329; 370/339; 370/345
(58) Field of Classification Search
USPC ................. 370/229, 230, 252, 310, 315, 351; 455/3.01, 400, 403, 7, 26.1, 73
See application file for complete search history.

(56) References Cited

U.S. PATENT DOCUMENTS

| | | | |
|---|---|---|---|
| 2008/0080635 | A1 | 4/2008 | Hugl et al. |
| 2008/0123660 | A1 | 5/2008 | Sammour et al. |
| 2008/0132281 | A1 | 6/2008 | Kim et al. |
| 2009/0135788 | A1* | 5/2009 | Zuniga et al. ................. 370/335 |
| 2009/0268675 | A1 | 10/2009 | Choi |
| 2009/0322613 | A1 | 12/2009 | Bala et al. |
| 2011/0158180 | A1* | 6/2011 | Melis et al. ................... 370/328 |
| 2011/0205983 | A1* | 8/2011 | Bharadwaj et al. ........... 370/329 |
| 2011/0286353 | A1* | 11/2011 | Blanz et al. ................... 370/252 |

FOREIGN PATENT DOCUMENTS

| | | |
|---|---|---|
| EP | 1376895 A2 | 1/2004 |
| WO | WO2008022243 | 2/2008 |
| WO | WO2009002269 A1 | 12/2008 |
| WO | WO2009023532 A2 | 2/2009 |

OTHER PUBLICATIONS

3rd Generation Partnership Project; Technical Specification Group Radio Access Network; Multiple Input Multiple Output in UTRA; (Release 7 ), 3GPP Standard; 3GPP TR 25.876, 3rd Generation Partnership Project (3GPP), Mobile Competence Centre; 650, Route Des Lucioles; F-06921 Sophia-Antipolis Cedex; France, No. V7.0.0, Mar. 1, 2007, pp. 1-76, , p. 35-52.
International Search Report and Written Opinion—PCT/US2010/057116, ISA/EPO—Jun. 24, 2011.

(Continued)

*Primary Examiner* — Kibrom T Hailu
(74) *Attorney, Agent, or Firm* — Darren M. Simon

(57) ABSTRACT

A method for providing multiple-user multiple-input and multiple-output in a high-speed packet access system is described. Channel quality indicators are received from a plurality of dual stream capable wireless communication devices. A preferred beam and a secondary beam are determined for each wireless communication device using the channel quality indicators. Wireless communication devices with preferred beams orthogonal to each other are paired. A wireless communication device pair is selected. Data streams for the selected wireless communication device pair are scheduled in the same transmission time interval using an orthogonal variable spreading factor code.

30 Claims, 9 Drawing Sheets

(56) References Cited

OTHER PUBLICATIONS

Potevio: "Considerations on Feedback Schemes for Codebook-based MU-MIMO in LTE-A", 3GPP Draft; R1-094804, 3rd Generation Partnership Project (3GPP), Mobile Competence Centre; 650, Route Des Lucioles; F-06921 Sophia-Antipolis Cedex; France, No. Jeju; Nov. 9, 2009, XP050389200, [retrieved on Nov. 3, 2009].

Qualcomm Europe et al., "Introduction of DC-HSUPA", 3GPP Draft; R1-095041 25214CR0570R5 (REL-9,B) Introduction of DC-HSUPA, 3rd Generation Partnership Project (3GPP), Mobile Competence Centre; 650, Route Des Lucioles; F-06921 Sophia-Antipolis Cedex; France, No. Jeju; Nov. 9, 2009, XP050389383, [retrieved on Nov. 13, 2009].

Qualcomm Europe: "Open issues on details in support of MIMO (FDD) for RREL-7", 3GPP Draft; R1-062440, 3rd Generation Partnership Project (3GPP), Mobile Competence Centre ; 650, Route Des Lucioles ; F-06921 Sophia-Antipolis Cedex ; France, vol. RAN WG1, No. Tallinn; Sep. 2, 2006, XP050102951, [retrieved on Sep. 2, 2006].

\* cited by examiner

|  | UE1 404a | UE2 404b | UE3 404c | UE4 404d | UE5 404e |
|---|---|---|---|---|---|
| UE5 404e | Non-Orthogonal | Non-Orthogonal | Non-Orthogonal | Non-Orthogonal | |
| UE4 404d | Orthogonal (User Equipment (UE) Pair) 432a | Non-Orthogonal | Non-Orthogonal | | Non-Orthogonal |
| UE3 404c | Non-Orthogonal | Orthogonal (User Equipment (UE) Pair) 432b | | Non-Orthogonal | Non-Orthogonal |
| UE2 404b | Non-Orthogonal | | Orthogonal (User Equipment (UE) Pair) 432b | Non-Orthogonal | Non-Orthogonal |
| UE1 404a | | Non-Orthogonal | Non-Orthogonal | Orthogonal (User Equipment (UE) Pair) 432a | Non-Orthogonal |

FIG. 4

MULTIPLE-USER MULTIPLE-INPUT AND MULTIPLE-OUTPUT FOR HIGH-SPEED PACKET ACCESS SYSTEMS

RELATED APPLICATIONS

This application is related to and claims priority from U.S. Provisional Patent Application Ser. No. 61/262,105, filed Nov. 17, 2009, for "MULTI-USER MIMO FOR HSPA."

TECHNICAL FIELD

The present disclosure relates generally to wireless communication systems. More specifically, the present disclosure relates to systems and methods for multiple-user multiple-input and multiple-output (MU-MIMO) for high-speed packet access (HSPA) systems.

BACKGROUND

Wireless communication systems are widely deployed to provide various types of communication content such as voice, video, data, and so on. These systems may be multiple-access systems capable of supporting simultaneous communication of multiple terminals with one or more base stations.

A problem that must be dealt with in all communication systems is fading or other interference. There may be problems with decoding the signals received. One way to deal with these problems is by utilizing beamforming. With beamforming, instead of using each transmit antenna to transmit a spatial stream, the transmit antennas each transmit a linear combination of the spatial streams, with the combination being chosen so as to optimize the response at the receiver.

Smart antennas are arrays of antenna elements, each of which receive a signal to be transmitted with a predetermined phase offset and relative gain. The net effect of the array is to direct a (transmit or receive) beam in a predetermined direction. The beam is steered by controlling the phase and gain relationships of the signals that excite the elements of the array. Thus, smart antennas direct a beam to each individual mobile unit (or multiple mobile units) as opposed to radiating energy to all mobile units within a predetermined coverage area (e.g., 120°) as conventional antennas typically do. Smart antennas increase system capacity by decreasing the width of the beam directed at each mobile unit and thereby decreasing interference between mobile units. Such reductions in interference result in increases in signal-to-interference and signal-to-noise ratios that improve performance and/or capacity. In power controlled systems, directing narrow beam signals at each mobile unit also results in a reduction in the transmit power required to provide a given level of performance.

Wireless communication systems may use beamforming to provide system-wide gains. In beamforming, multiple antennas on the transmitter may steer the direction of transmissions towards multiple antennas on the receiver. Beamforming may reduce the signal-to-noise ratio (SNR). Beamforming may also decrease the amount of interference received by terminals in neighboring cells. Benefits may be realized by providing improved beamforming techniques.

SUMMARY

A method for providing multiple-user multiple-input and multiple-output in a high-speed packet access system is described. Channel quality indicators are received from a plurality of dual stream capable wireless communication devices. A preferred beam and a secondary beam are determined for each wireless communication device using the channel quality indicators. Wireless communication devices with preferred beams orthogonal to each other are paired. A wireless communication device pair is then selected. Data streams for the selected wireless communication device pair are scheduled in the same transmission time interval using an orthogonal variable spreading factor code.

The wireless communication devices may be user equipment. The method may be performed by a Node B. Pairing the wireless communication devices may include comparing the preferred beams of each wireless communication device served by the Node B. The wireless communication device pair may include a first wireless communication device and a second wireless communication device. Scheduling data streams for the selected wireless communication device pair may include scheduling a first data stream on the preferred beam of the first wireless communication device and scheduling a second data stream on the preferred beam of the second wireless communication device.

The first data stream and the second data stream may be transmitted simultaneously. The orthogonal variable spreading factor code may have a spreading factor of sixteen. The method may be performed for each transmission time interval. Pairing wireless communication devices with preferred beams orthogonal to each other may include using a comparison table. Selecting a wireless communication device pair may include selecting the wireless communication device pair from a plurality of wireless communication device pairs. The selected wireless communication device pair may maximize a metric during the transmission time interval.

A wireless device configured for providing multiple-user multiple-input and multiple-output in a high-speed packet access system is also described. The wireless device includes a processor, memory in electronic communication with the processor and instructions stored in the memory. The instructions are executable by the processor to receive channel quality indicators from a plurality of dual stream capable wireless communication devices. The instructions are also executable by the processor to determine a preferred beam and a secondary beam for each wireless communication device using the channel quality indicators. The instructions are further executable by the processor to pair wireless communication devices with preferred beams orthogonal to each other. The instructions are also executable by the processor to select a wireless communication device pair. The instructions are further executable by the processor to schedule data streams for the selected wireless communication device pair in the same transmission time interval using an orthogonal variable spreading factor code.

A wireless device configured for providing multiple-user multiple-input and multiple-output in a high-speed packet access system is described. The wireless device includes means for receiving channel quality indicators from a plurality of dual stream capable wireless communication devices. The wireless device also includes means for determining a preferred beam and a secondary beam for each wireless communication device using the channel quality indicators. The wireless device further includes means for pairing wireless communication devices with preferred beams orthogonal to each other. The wireless device also includes means for selecting a wireless communication device pair. The wireless device further includes means for scheduling data streams for the selected wireless communication device pair in the same transmission time interval using an orthogonal variable spreading factor code.

A computer-program product for providing multiple-user multiple-input and multiple-output in a high-speed packet access system is also described. The computer-program product includes a non-transitory computer-readable medium having instructions thereon. The instructions include code for causing a base station to receive channel quality indicators from a plurality of dual stream capable wireless communication devices. The instructions also include code for causing the base station to determine a preferred beam and a secondary beam for each wireless communication device using the channel quality indicators. The instructions further include code for causing the base station to pair the wireless communication devices with preferred beams orthogonal to each other. The instructions also include code for causing the base station to select a wireless communication device pair. The instructions further include code for causing the base station to schedule data streams for the selected wireless communication device pair in the same transmission time interval using an orthogonal variable spreading factor code.

BRIEF DESCRIPTION OF THE DRAWINGS

FIG. 4 is a block diagram illustrating a comparison table for pairing user equipments (UEs);

DETAILED DESCRIPTION

The 3$^{rd}$ Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In 3GPP LTE, a mobile station or device may be referred to as a "user equipment" (UE). A base station may be referred to as an evolved NodeB (eNB). A semi-autonomous base station may be referred to as a home eNB (HeNB). An HeNB may thus be one example of an eNB.

Figure 1:
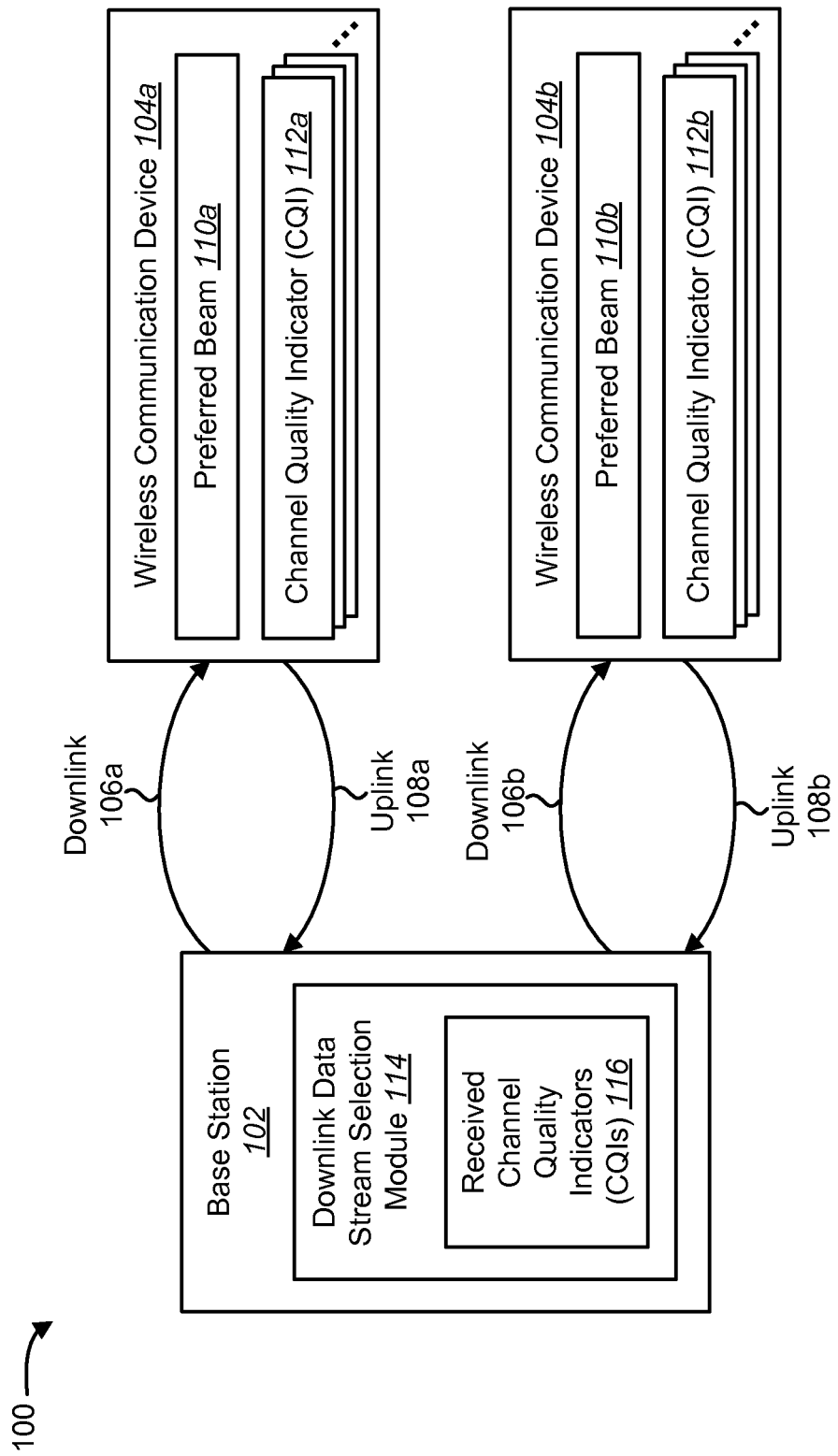
FIG. 1 shows a wireless communication system with multiple wireless devices.

FIG. 1 shows a wireless communication system 100 with multiple wireless devices. Wireless communication systems 100 are widely deployed to provide various types of communication content such as voice, data, and so on. A wireless device may be a base station 102 or a wireless communication device 104.

A base station 102 is a station that communicates with one or more wireless communication devices 104. A base station 102 may also be referred to as, and may include some or all of the functionality of, an access point, a broadcast transmitter, a NodeB, an evolved NodeB, etc. The term "Base Station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

Communications in a wireless system (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink 108$a$-$b$ and downlink 106$a$-$b$ transmissions are on the same frequency region so that the reciprocity principle allows the estimation of the downlink 106 channel from the uplink 108 channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, Third Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

A base station 102 may communicate with one or more wireless communication devices 104. For example, the base station 102 may communicate with a first wireless communication device 104$a$ and a second wireless communication device 104b. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, etc.

A wireless communication device 104 may communicate with zero, one, or multiple base stations 102 on the downlink 106 and/or uplink 108 at any given moment. The downlink 106 (or forward link) refers to the communication link from a base station 102 to a wireless communication device 104, and the uplink 108 (or reverse link) refers to the communication link from a wireless communication device 104 to a base station 102.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink. HSDPA and HSUPA are thus parts of the family of mobile telephony protocols named High-Speed Packet Access (HSPA). Release 7 HSPA+ uses three enhancements to improve data rate. First, support was introduced for 2×2 multiple-input and multiple-output (MIMO) on the downlink 106. With MIMO, the peak data rate supported on the downlink 106 is 28 megabits per second (Mbps). Second, higher order modulation was introduced on the downlink 106. The use of 64 quadrature amplitude modulation (QAM) on the downlink 106 allows peak data rates of 21 Mbps. Third, higher order modulation was introduced on the uplink 108. The use of 16 QAM on the uplink 108 allows peak data rates of 11 Mbps.

In HSUPA, the base station 102 may allow several wireless communication devices 104 to transmit at a certain power level at the same time (using grants). These grants are assigned to wireless communication devices 104 by using a fast scheduling algorithm that allocates the resources on a short-term basis (i.e., on the order of tens of milliseconds (ms)). The rapid scheduling of HSUPA is well suited to the bursty nature of packet data. During periods of high activity, a wireless communication device 104 may get a larger percentage of the available resources, while getting little or no bandwidth during periods of low activity.

In 3GPP Release 5 HSDPA, a base station 102 may send downlink payload data to wireless communication devices on the High-Speed Downlink Shared Channel (HS-DSCH). A base station 102 may also send the control information associated with the downlink data on the High-Speed Shared Control Channel (HS-SCCH). There are 256 Orthogonal Variable Spreading Factor (OVSF) codes (or Walsh codes) used for data transmission. In HSDPA systems, these codes are partitioned into Release 1999 (legacy system) codes that are typically used for cellular telephony (voice) and HSDPA codes that are used for data services. For each transmission time interval (TTI), the dedicated control information sent to an HSDPA-enabled wireless communication device 104 may indicate to the wireless communication device 104 which codes within the code space will be used to send downlink payload data to the wireless communication device 104 and the modulation that will be used for transmission of the downlink payload data.

With HSDPA operations, downlink transmissions to the wireless communication devices 104a-b may be scheduled for different transmission time intervals using the 15 available HSDPA Orthogonal Variable Spreading Factor (OVSF) codes. For a given transmission time interval (TTI), each wireless communication device 104 may be using one or more of the 15 HSDPA codes, depending on the downlink bandwidth allocated to the wireless communication device 104 during the transmission time interval (TTI). As discussed above, for each transmission time interval (TTI), the control information indicates to the wireless communication device 104 which codes within the code space will be used to send downlink payload data (data other than control data of the wireless communications system 100) to the wireless communication device 104, along with the modulation that will be used for the transmission of the downlink payload data.

Based on communications received from a base station 102, a wireless communication device 104 may generate one or more channel quality indicators (CQIs) 112a-b. Each channel quality indicator (CQI) 112 may be a channel measurement for the downlink 106 channel between the base station 102 and the wireless communication device 104. A channel quality indicator (CQI) 112 may be dependent on the transmission scheme used in the wireless communications system 100. Because multiple-input and multiple-output (MIMO) communication is used between the base station 102 and the wireless communication device 104, each channel quality indicator (CQI) 112 may correspond to a different downlink 106 channel (i.e., a different transmit antenna and receive antenna pair) between the base station 102 and the wireless communication device 104.

A wireless communication device 104 may use the channel quality indicators (CQIs) 112 to determine a preferred beam 110a-b. A preferred beam 110 may refer to the antenna structure, weight, transmission direction and phase of a signal transmitted by the base station 102 to the wireless communication device 104. The terms "beam" and "precoding vector" may refer to the direction in which data is streamed wirelessly from an antenna. In multiple-input and multiple-output (MIMO), multiple beams may be used to transmit information between a base station 102 and a wireless communication device 104. A preferred beam may thus refer to a beam that produces the best (i.e., the optimal) data stream between the base station 102 and the wireless communication device 104.

A wireless communication device 104 may transmit the channel quality indicators (CQIs) 112 to the base station 102 via the uplink 108 channel. The base station 102 may thus receive channel quality indicators (CQI) 112 from many wireless communication devices 104 corresponding to many downlink 106 channels. The base station 102 may include a downlink data stream selection module 114. The downlink data stream selection module 114 may include the received channel quality indicators (CQIs) 116. The downlink data stream selection module 114 may use the received channel quality indicators (CQIs) 116 to determine scheduling for each wireless communication device 104. The downlink data stream selection module 114 is discussed in further detail below in relation to FIG. 2.

In Release 7 of HSPA, single-user MIMO (SU-MIMO) is used. When a wireless communication device 104 has good geometry (i.e., the wireless communication device 104 is in a good position relative to the base station 102), the wireless communication device 104 may request dual-stream transmissions from the base station 102. In dual-stream transmissions, the base station 102 may transmit a first data stream and a second data stream to a wireless communication device 104 during a transmission time interval (TTI). The first data stream and the second data stream may be transmitted on orthogonal antenna beams. It is inherent that one of the data streams (i.e., a preferred data stream) will have a higher throughput than the other. When a MIMO capable wireless communication device 104 requests dual-stream transmission, the channel quality indicator (CQI) 112 of the preferred beam may be higher than that of an orthogonal beam used in addition to the preferred beam. Hence, transmitting on both data streams to a wireless communication device 104 may not result in the most efficient resource usage.

In contrast, multiple-user MIMO (MU-MIMO) may increase user throughputs on the downlink 106 over traditional SU-MIMO by making more intelligent use of the base station 102 resources. MU-MIMO may enable an increase in throughput for a particular transmission time interval (TTI) compared to dual-stream transmission to a single wireless communication device 104. The downlink data stream selection module 114 may thus determine whether to use dual downlink data streams for a single wireless communication device 104 (i.e., SU-MIMO) or to use a first data stream for a first wireless communication device 104a and a second data stream that is orthogonal to the first data stream for a second wireless communication device 104b (i.e., MU-MIMO).

Figure 2:
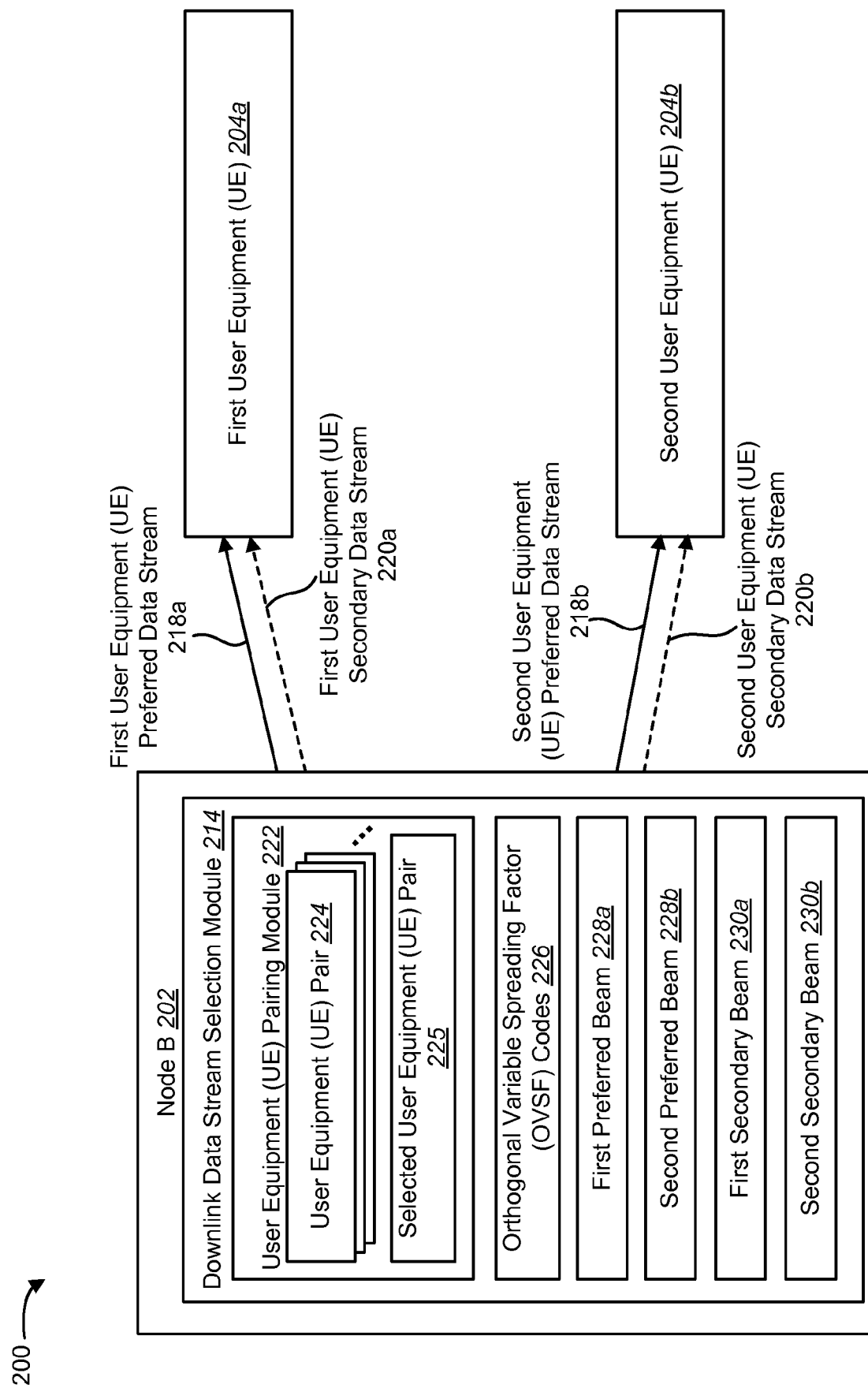
FIG. 2 shows another wireless communication system with multiple wireless devices.

FIG. 2 shows another wireless communication system 200 with multiple wireless devices. The wireless communication system 200 may include a Node B 202. The Node B 202 of FIG. 2 may be one configuration of the base station 102 of FIG. 1. The wireless communication system 200 may also include a first user equipment (UE) 204a and a second user equipment (UE) 204b. The first user equipment (UE) 204a and the second user equipment (UE) 204b of FIG. 2 may be one configuration of the wireless communication devices 104a-b of FIG. 1.

The Node B 202 may include a downlink data stream selection module 214. The downlink data stream selection module 214 of FIG. 2 may be one configuration of the downlink data stream selection module 114 of FIG. 1. The downlink data stream selection module 214 may include a user equipment (UE) pairing module 222. The user equipment (UE) pairing module 222 may determine one or more user equipment (UE) pairs 224. A user equipment (UE) pair 224 may refer to two user equipments (UEs) 204 with preferred data streams 218 that are orthogonal to each other. User equipment (UE) pairs 224 are discussed in additional detail below in relation to FIG. 4. The Node B 202 may also include a selected user equipment (UE) pair 225. Since the Node B 202 can only transmit two orthogonal data streams at a time, only one user equipment (UE) pair 224 may be selected as the user equipment (UE) pair 225. Optimization procedures may be used to determine the selected user equipment (UE) pair 225.

The Node B 202 may also include orthogonal variable spreading factor (OVSF) codes 226. An orthogonal variable spreading factor (OVSF) code 226 is an orthogonal code that facilitates uniquely identifying individual communication channels. Orthogonal variable spreading factor (OVSF) codes 226 are discussed in additional detail below.

The Node B 202 may communicate with the first user equipment (UE) 204a during a first transmission time interval (TTI) using SU-MIMO. For example, the Node B 202 may transmit a first user equipment (UE) preferred data stream 218a to the first user equipment (UE) 204a using a first preferred beam 228a. The Node B 202 may also transmit a first user equipment (UE) secondary data stream 220a to the first user equipment (UE) 204a using a first secondary beam 230a. The first preferred beam 228a and the first secondary beam 230a may be orthogonal to each other.

During a second transmission time interval (TTI), the Node B 202 may communicate with the second user equipment (UE) 204b. For example, the Node B 202 may transmit a second user equipment (UE) preferred data stream 218b to the second user equipment (UE) 204b using a second preferred beam 228b. The Node B 202 may also transmit a second user equipment (UE) secondary data stream 220b to the second user equipment (UE) 204b using a second secondary beam 230b. The second preferred beam 228b and the second secondary beam 230b may be orthogonal to each other.

Sending two data streams on orthogonal beams to the same user equipment (UE) 204 may not result in the best resource usage for the wireless communication system 200. In other words, sending two data streams on orthogonal beams to the same user equipment (UE) 204 may not allocate power in the Node B 202 in the most efficient way because the preferred data stream 218 has a stronger channel quality indicator (CQI) 112 than a secondary data stream 220. If the same amount of power is used to transmit each data stream, throughput for the secondary data stream 220 will be lower than throughput for the preferred data stream 218 (due to the secondary data stream 220 having a lower channel quality indicator (CQI)) 112.

By using MU-MIMO instead of SU-MIMO, user throughputs on the downlink 106 may be increased by more intelligently using the resources of the Node B 202. In MU-MIMO, the Node B 202 may find a first user equipment (UE) 204a and a second user equipment (UE) 204b with preferred beams 228 that are orthogonal to each other. The first user equipment (UE) 204a and the second user equipment (UE) 204b may be referred to as a user equipment (UE) pair 224.

Instead of transmitting a dual stream (i.e., a preferred data stream 218 and a secondary data stream 220) during one transmission time interval (TTI) to a user equipment (UE) 204, the Node B 202 may transmit a first user equipment (UE) preferred data stream 218a to the first user equipment (UE) 204a while simultaneously transmitting a second user equipment (UE) preferred data stream 218b to the second user equipment (UE) 204b. Thus, the Node B 202 may refrain from transmitting a first user equipment (UE) secondary stream 220a and a second user equipment (UE) secondary stream 220b. The Node B 202 may transmit the first user equipment (UE) preferred data stream 218a and the second user equipment (UE) preferred data stream 218b using the same codes (e.g., an orthogonal variable spreading factor (OVSF) code 226 with a spreading factor of sixteen). Because the Node B 202 does not have to allocate power to a data stream with lower throughput, the throughput for the wireless communication system 200 may be improved.

The Node B 202 may transmit the first user equipment (UE) preferred data stream 218a using a first preferred beam 228a. The Node B 202 may transmit the first user equipment (UE) secondary stream 220a using a first secondary beam 230a. The Node B 202 may transmit the second user equipment (UE) preferred data stream 218b using a second preferred beam 228b. The Node B 202 may also transmit the second user equipment (UE) secondary data stream 220b using a second secondary beam 230b. If the first user equipment (UE) 204a and the second user equipment (UE) 204b are a user equipment (UE) pair 224, then the first preferred beam 228a and the second preferred beam 228b are orthogonal.

Figure 3:
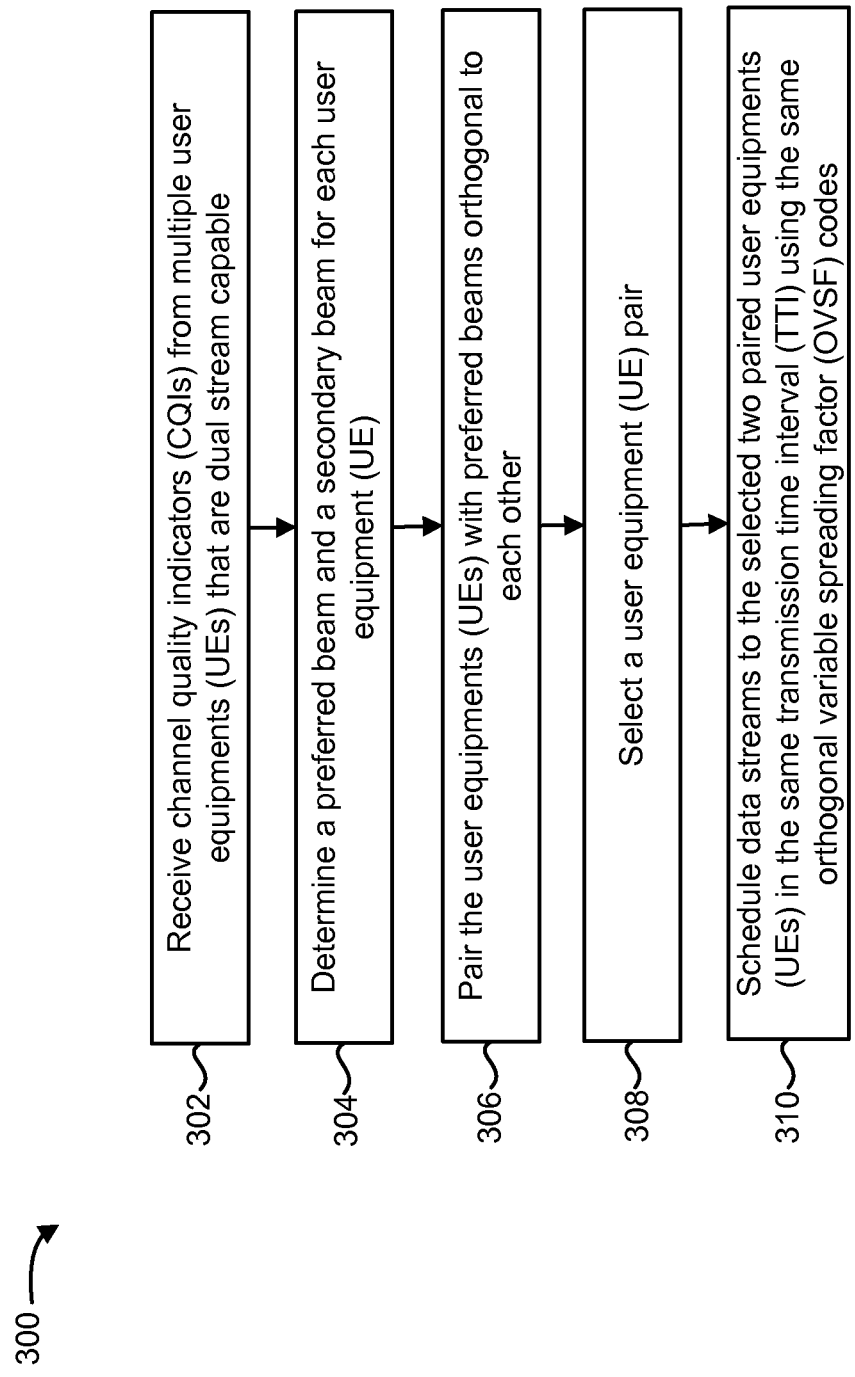
FIG. 3 is a flow diagram of a method for jointly scheduling data streams to two paired user equipments (UEs)

FIG. 3 is a flow diagram of a method 300 for jointly scheduling data streams to two paired user equipments (UEs) 204. The user equipments (UEs) 204 may be wireless communication devices 104. The method 300 may be performed by a base station 102. In one configuration, the base station 102 may be a Node B 202.

The base station 102 may receive 302 channel quality indicators (CQIs) 112 from multiple user equipments (UEs)

204 that are dual stream capable. As discussed above, a user equipment (UE) 204 that is dual stream capable can receive two data streams during the same transmission time interval (TTI). The base station 102 may determine 304 a preferred beam 228 and a secondary beam 230 for each user equipment (UE) 204. For example, the base station 102 may determine 304 a first preferred beam 228a and a first secondary beam 230a for a first user equipment (UE) 204a. The base station 102 may also determine 304 a second preferred beam 228b and a second secondary beam 230b for a second user equipment (UE) 204b.

The base station 104 may pair 306 the user equipments (UEs) with preferred beams 228 orthogonal to each other. These combinations may be referred to as user equipment (UE) pairs 224. In one configuration, the base station 102 may construct a table that identifies the user equipment (UE) pairs 224. An example of a table that identifies the user equipment (UE) pairs 224 is discussed in additional detail below in relation to FIG. 4.

The base station 102 may select 308 a user equipment (UE) pair 224 as the selected user equipment (UE) pair 225. In one configuration, the base station 102 may select 308 a user equipment (UE) pair 224 if the sum rate of data streams for two different user equipments (UEs) 204 is larger than the UE-specific sum rate of the two data streams. For example, if the first user equipment (UE) 204a requests two data streams, the first user equipment (UE) 204a may report a preferred primary precoding vector b1 and the two channel quality indicators (CQIs) 112 CQI1 and CQI2 that correspond to the preferred (strong) data stream 218a and the secondary (weak) data stream 220a, respectively. Similarly, if the second user equipment (UE) 204b requests two streams of data, the second user equipment (UE) 204b may report a preferred primary precoding vector b2 and channel quality indicators (CQIs) 112 CQI1' and CQI2' for both data streams.

The preferred secondary precoding vector (that is orthogonal to b1) is b2 and may be known by the base station 102 based on the preferred primary precoding vector b1. If CQI1>CQI1' and CQI2>CQI2', the first user equipment (UE) preferred data stream 218a may be mapped to precoding vector b1 and the second user equipment (UE) preferred data stream 218b may be mapped to precoding vector b2. The base station 102 may only be capable of sending a maximum of two data streams in a given transmission time interval (TTI) on orthogonal beams. Therefore, only user equipments (UEs) 204 that have orthogonal preferred beams 228 may be paired.

If both the first user equipment (UE) 204a and the second user equipment (UE) 204b request beams b1 and b2, the base station 102 may pair the two user equipments (UEs) 204 on beams b1 and b2. If the base station 102 finds this pairing to be maximizing a certain metric during the transmission time interval (TTI), the base station 102 may schedule data streams to the selected user equipment (UE) pair 225 in the same transmission time interval (TTI) using the same orthogonal variable spreading factor (OVSF) codes 226. One example of a metric that may be maximized is the sum proportional fair metric. In the sum proportional fair metric, the proportional fair metrics per stream are summed whenever MU-MIMO transmission is considered. Other metrics may also be used.

FIG. 4 is a block diagram illustrating a comparison table for pairing user equipments (UEs) 404. In the table, five user equipments (UEs) 404a-e are compared to determine user equipment (UE) pairs 432. Each of the user equipments (UEs) 404 is dual stream capable. However, only the preferred beam 228 for each user equipment (UE) 404 is compared with the preferred beam 228 for each other user equipment (UE) 404.

A user equipment (UE) pair 432 occurs when the preferred beam 228 for one user equipment (UE) 404 is orthogonal to the preferred beam 228 for another user equipment (UE) 404. For example, the preferred beam 228 for UE1 404a may be orthogonal to the preferred beam 228 for UE4 404d. Thus, UE1 404a and UE4 404d are a user equipment (UE) pair 432a. As another example, the preferred beam 228 for UE2 404b may be orthogonal to the preferred beam 228 for UE3 404c. Thus, UE2 404b and UE3 404c are a user equipment (UE) pair 432b. If the preferred beams 228 for user equipments (UEs) 404 are not orthogonal, the matchup may be listed as non-orthogonal. A user equipment (UE) 404 may have a preferred beam 228 that is orthogonal to the preferred beams 228 of multiple user equipments (UEs) 404. A user equipment (UE) 404 may also have a preferred beam 228 that is orthogonal to none of the preferred beams 228 of the user equipments (UEs) 404 available for pairing. For example, UE5 404e is shown as having a preferred beam 228 that is non-orthogonal to the preferred beams 228 of the other user equipments (UEs) 404.

In case of multiple user equipment (UE) pairs 432, a base station 102 may select one of the user equipment (UE) pairs 432. Many different methods may be used for selecting one of the user equipment (UE) pairs 432. For example, a sum proportional fair metric may be used.

Usually scheduling aims to maximize a utility function $U(R_1(t), \ldots, R_N(t))$ by allocating resources per transmission time interval (TTI) to certain users. The utility function for proportional fairness is given in Equation (1):

$$U(R_1(t), \ldots, R_N(t)) = \sum_{i=1}^{N} \log(R_i(t)) \to \max. \qquad (1)$$

In Equation (1) $R_i(t)$ denotes the average throughput of user i at time t. Assuming one stream, Equation (1) is equivalent to the resource allocation rule per transmission time interval (TTI) in Equation (2):

$$\max_{\delta_i} \sum_{i=1}^{N} \frac{\delta_i \cdot r_i(t)}{R_i(t)}, \delta_i \in \{0, 1\}. \qquad (2)$$

In Equation (2), $r_i(t)$ denotes the instantaneous rate the offers to user i at time t and $\delta_i \in \{0,1\}$ indicates the resource allocation to user i. The task of the scheduler is to allocate resources per transmission time interval (TTI) (i.e., to choose the indices $\delta_i$ in order to maximize the utility function). The resource allocation rule can be generalized for SU-MIMO in Equation (3):

$$\max_{\delta_i} \sum_{i=1}^{N} \frac{\delta_i \sum_{j=1}^{M} r_{ij}(t)}{R_i(t)}, \delta_i \in \{0, 1\}. \qquad (3)$$

For a 2×2 MU-MIMO, the rule to pair the users $i_1$ and $i_2$ is given in Equation (4):

$$\max_{\substack{i_1,i_2 \in [1,...,N] \\ i_1 \neq i_2}} \left( \max\left( \frac{r_{i_1 1}(t)}{R_{i_1}(t)} + \frac{r_{i_2 2}(t)}{R_{i_2}(t)}; \frac{r_{i_1 2}(t)}{R_{i_1}(t)} + \frac{r_{i_2 1}(t)}{R_{i_2}(t)} \right) \right). \quad (4)$$

The pairing algorithm decides which users and streams are paired per transmission time interval (TTI) according to the MU-MIMO proportional fair rule. The pairing algorithm then determines ∀ precoding vectors $b_k$, k=1 . . . 4 and all candidate users $u_j$ per transmission time interval (TTI). The candidate sets are U($b_k$)={($u_j$, CQI($b_k$)}, where $b_k$ is a preferred primary precoding vector for $u_j$. Candidate users do not require a rank-2 CQI report. Precoding vectors $b_k$ and $b_{5-k}$ are assumed to be orthogonal. The user pairs for MU-MIMO transmission may then be determined using one or more approaches. In one approach, the user pairs ($u_i$,$u_j$)∈(U($b_k$),U($b_{5-k}$)) can be scheduled. For linear receivers, the preferred precoding vector offers a better CQI. This approach works irrespective of the receiver architecture.

A ranking algorithm may then be used. The ranking algorithm may identify per transmission time interval (TTI) the highest prioritized MU-MIMO pairs and the highest prioritized SU-MIMO users. A user is called eligible if it has a free HARQ process and data in its MAC priority queue(s). The reported CQI (quantized signal to noise ratio (SNR) in decibels (dB)) may be mapped to a spectral efficiency (in bits/symbol) for each eligible user.

An SU-MIMO user ranking list may then be calculated for all eligible users according to the proportional fair rule. Single or dual stream SU-MIMO may be assumed for each eligible user depending on the reported channel rank. The highest prioritized MU-MIMO eligible pair according to the user pairing approach may be determined according to the proportional fair rule. If needed, the spectral efficiencies may be resealed to account for the power split between the paired users. Based on a priority comparison, either the highest prioritized user from the SU-MIMO ranking list or the highest prioritized MU-MIMO user pair may be scheduled in the instantaneous transmission time interval (TTI) (assuming that only one user for SU-MIMO or one user pair for MU-MIMO is scheduled per transmission time interval (TTI)). A CQI mapping table may then be used.

Figure 5:
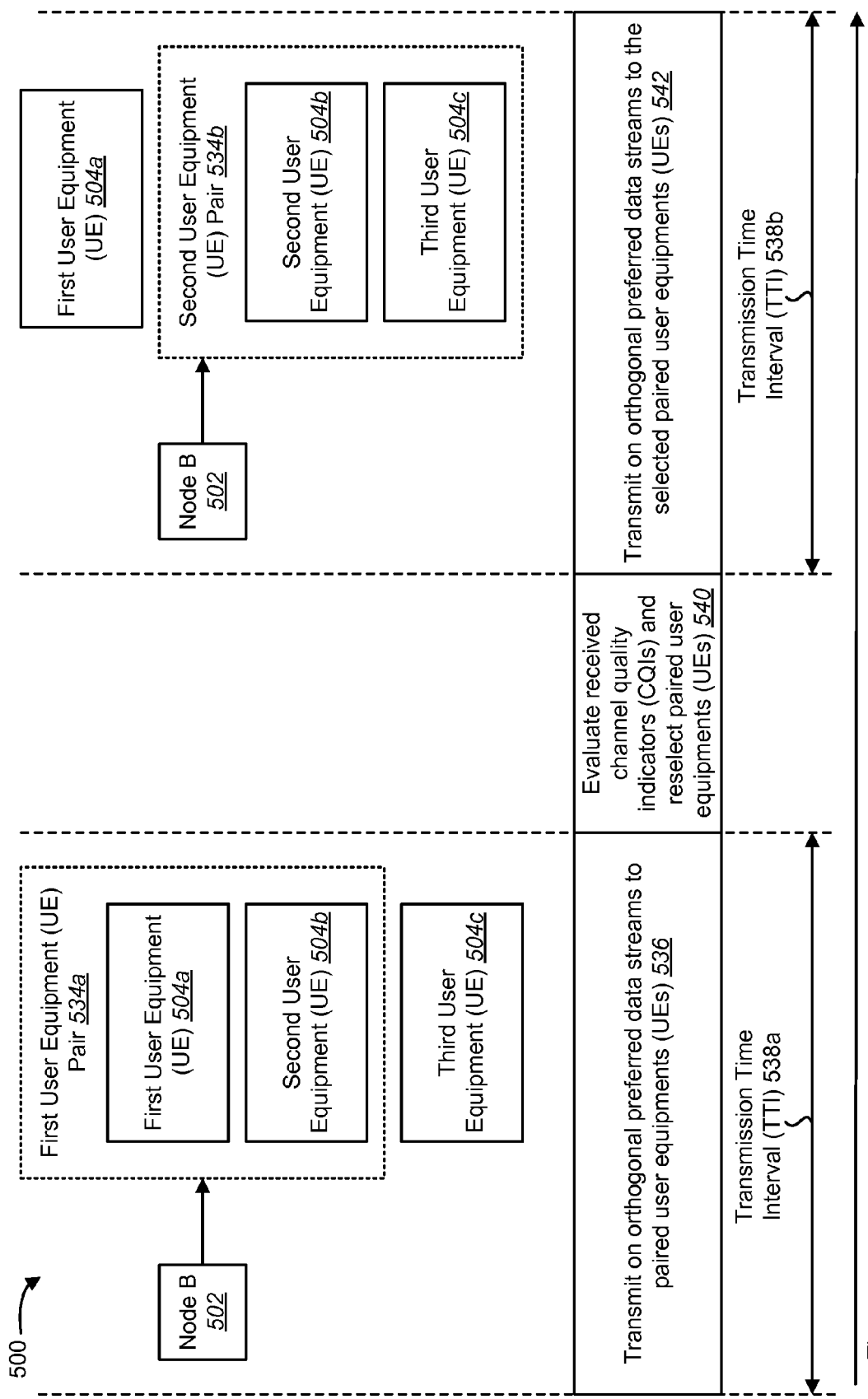
FIG. 5 is a block diagram illustrating a timeline with multiple transmission time intervals (TTIs)

FIG. 5 is a block diagram illustrating a timeline 500 with multiple transmission time intervals (TTIs) 538. A Node B 502 may communicate with a first user equipment (UE) 504a, a second user equipment (UE) 504b and a third user equipment (UE) 504c. During a first transmission time interval (TTI) 538a, the first user equipment (UE) 504a and the second user equipment (UE) 504b may be part of a first user equipment (UE) pair 534a. The Node B 502 may transmit 536 on orthogonal preferred data streams 218 to the first user equipment (UEs) pair 534 (i.e., to the first user equipment (UE) 504a using a first user equipment (UE) preferred data stream 218a and to the second user equipment (UE) 504b using a second user equipment (UE) preferred data stream 218b) during the first transmission time interval (TTI) 538a.

After the first transmission time interval (TTI) 538a, the Node B 502 may evaluate 540 received channel quality indicators (CQIs) 112 and reselect the user equipment (UE) pair 534. For example, the Node B 502 may select a second user equipment (UE) pair 534b for a second transmission time interval (TTI) 538b. The second user equipment (UE) pair 534b may include the second user equipment (UE) 504b and the third user equipment (UE) 504c. The Node B 502 may then transmit 542 on the orthogonal preferred data streams 218 to the selected user equipment (UE) pair 534b (i.e., to the second user equipment (UE) 504b using a second user equipment (UE) preferred data stream 218b and to the third user equipment (UE) 504c using a third user equipment (UE) preferred data stream (not shown)) during the second transmission time interval (TTI) 538b.

Figure 6:
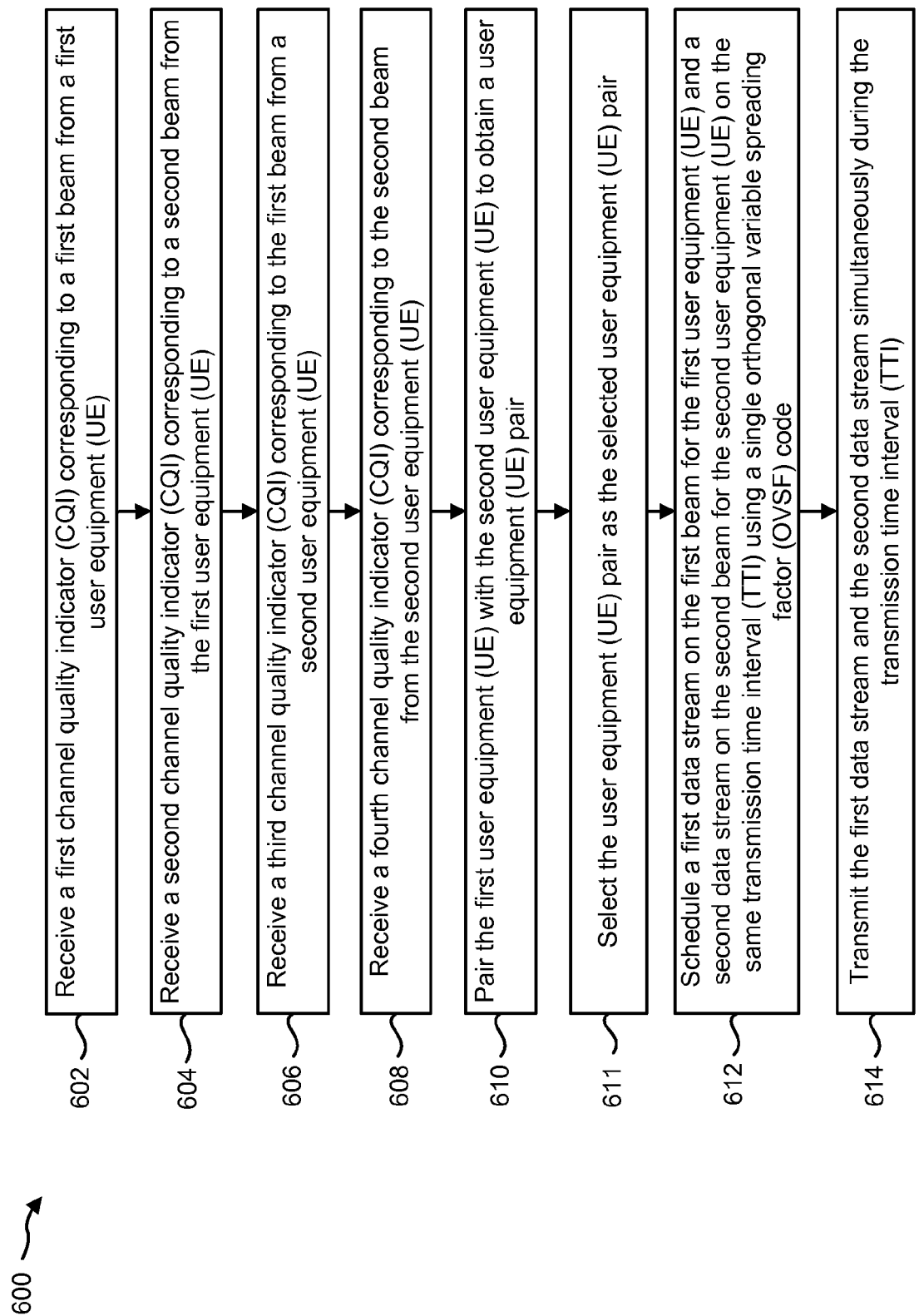
FIG. 6 is a flow diagram of another method for jointly scheduling data streams to paired user equipments (UEs)

FIG. 6 is a flow diagram of another method 600 for jointly scheduling data streams to two paired user equipments (UEs) 204. The method 600 may be performed by a base station 102. In one configuration, the base station 102 may be a Node B 202. The user equipments (UEs) 204 may be wireless communication devices 104.

The Node B 202 may receive 602 a first channel quality indicator (CQI) 112 corresponding to a first beam from a first user equipment (UE) 204a. The first user equipment (UE) 204 may have obtained the first channel quality indicator (CQI) 112 by measuring a first downlink 106 channel between the Node B 202 and the first user equipment (UE) 204a. The Node B 202 may also receive 604 a second channel quality indicator (CQI) 112 corresponding to a second beam from the first user equipment (UE) 204a.

The Node B 202 may receive 606 a third channel quality indicator (CQI) 112 corresponding to the first beam from a second user equipment (UE) 204b. The Node B 202 may have previously communicated (i.e., in a prior transmission time interval (TTI) 538) with both the first user equipment (UE) 204a and the second user equipment (UE) 204b using the first beam. The Node B 202 may also receive 608 a fourth channel quality indicator (CQI) 112 corresponding to the second beam from the second user equipment (UE) 204b. The Node B 202 may thus have previously communicated (i.e., in a prior transmission time interval (TTI) 538) with both the first user equipment (UE) 204a and the second user equipment (UE) 204b using the second beam.

The Node B 202 may pair 610 the first user equipment (UE) 204a with the second user equipment (UE) 204b to obtain a user equipment (UE) pair 224. The first user equipment (UE) 204a and the second user equipment (UE) 204b may be paired if a preferred beam 228 for the first user equipment (UE) 204a (i.e., the first beam) is orthogonal to a preferred beam 228 for the second user equipment (UE) 204b (i.e., the second beam). A Node B 202 may obtain multiple user equipment (UE) pairs 224. As discussed above, a user equipment (UE) 204 may be involved in more than one user equipment (UE) pair 224.

The Node B 202 may select 611 the user equipment (UE) pair 224 as the selected user equipment (UE) pair 225. For example, the Node B 202 may select 611 the user equipment (UE) pair 224 with the best possible gains as the selected user equipment (UE) pair 225. For individual user equipments (UEs) 204, a proportional fair metric may be used. For user equipment (UE) pairs 224, a sum-proportional fair metric may be used.

The Node B 202 may then schedule 612 a first data stream on the first beam for the first user equipment (UE) 204a (i.e., the first user equipment (UE) preferred data stream 218a) and a second data stream on the second beam for the second user equipment (UE) 204b (i.e., the second user equipment (UE) preferred data stream 218b) on the same transmission time interval (TTI) 538 using a single orthogonal variable spreading factor (OVSF) code 226. The Node B 202 may then transmit 614 the first data stream and the second data stream simultaneously during the transmission time interval (TTI) 538.

Figure 7:
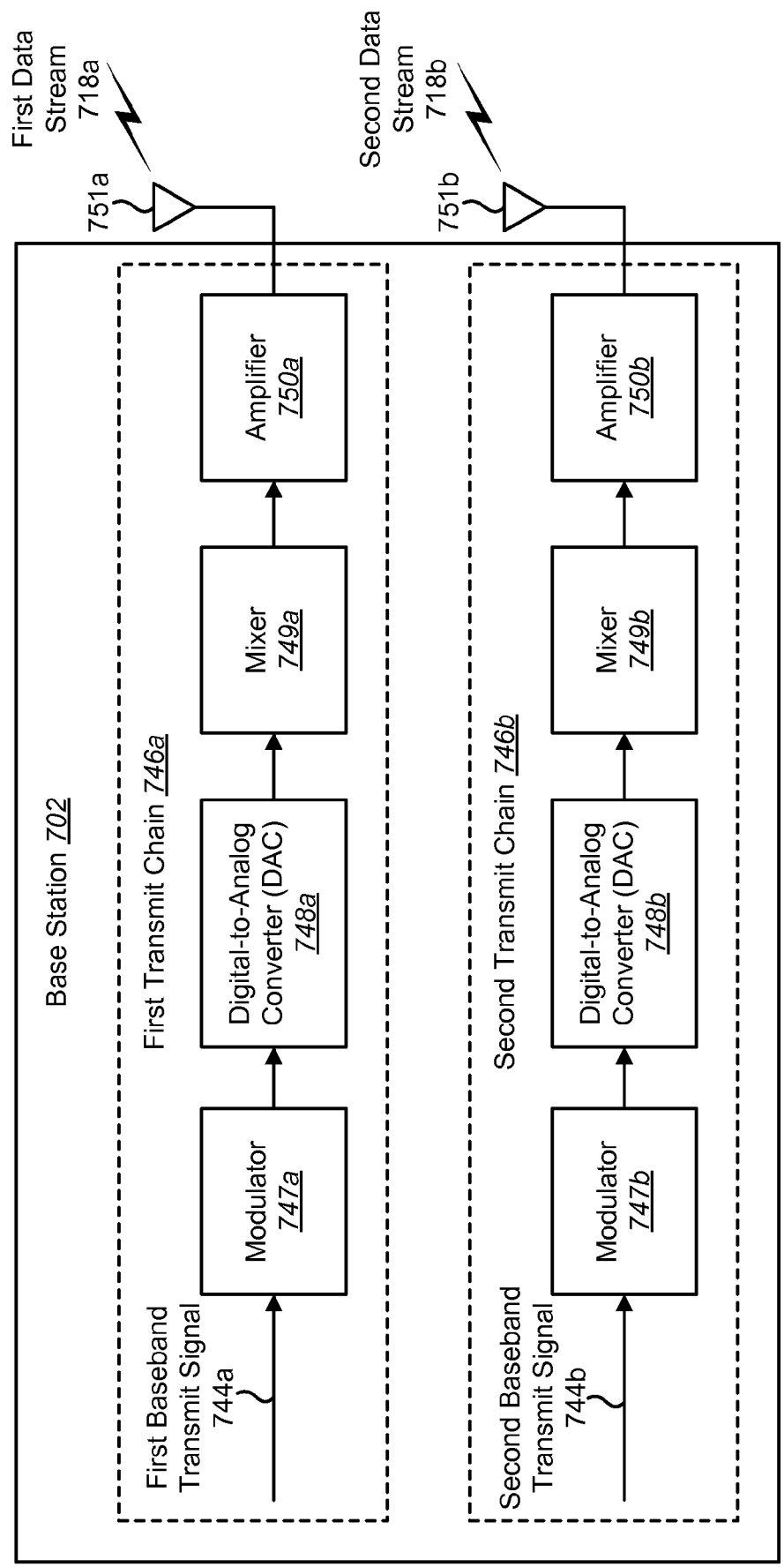
FIG. 7 is a block diagram of a base station for use in the present systems and methods.

FIG. 7 is a block diagram of a base station 702 for use in the present systems and methods. The base station 702 of FIG. 7 may be one configuration of the base station 102 of FIG. 1. The base station 702 may include a first transmit chain 746a and a second transmit chain 746b. The first transmit chain 746a may be used for a first data stream 718a and the second transmit chain 746b may be used for a second data stream 718b.

The first transmit chain 746a may include a first baseband transmit signal 744a. The first baseband transmit signal 744a may be modulated using a modulator 747a, converted from a digital signal to an analog signal using a digital-to-analog converter (DAC) 748a, frequency converted using a mixer 749a, amplified using an amplifier 750a and finally transmitted by a first antenna 751a as the first data stream 718a. Likewise, the second transmit chain 746b may include a second baseband transmit signal 744b. The second baseband transmit signal 744b may be modulated using a modulator 747b, converted from a digital signal to an analog signal using a digital-to-analog converter (DAC) 748b, frequency converted using a mixer 749b, amplified using an amplifier 750b and finally transmitted by a second antenna 751b as the second data stream 718b. As discussed above, the first data stream 718a and the second data stream 718b may be transmitted during the same transmission time interval (TTI) 538 using the same orthogonal variable spreading factor (OVSF) codes 226 with orthogonal beams.

Figure 8:
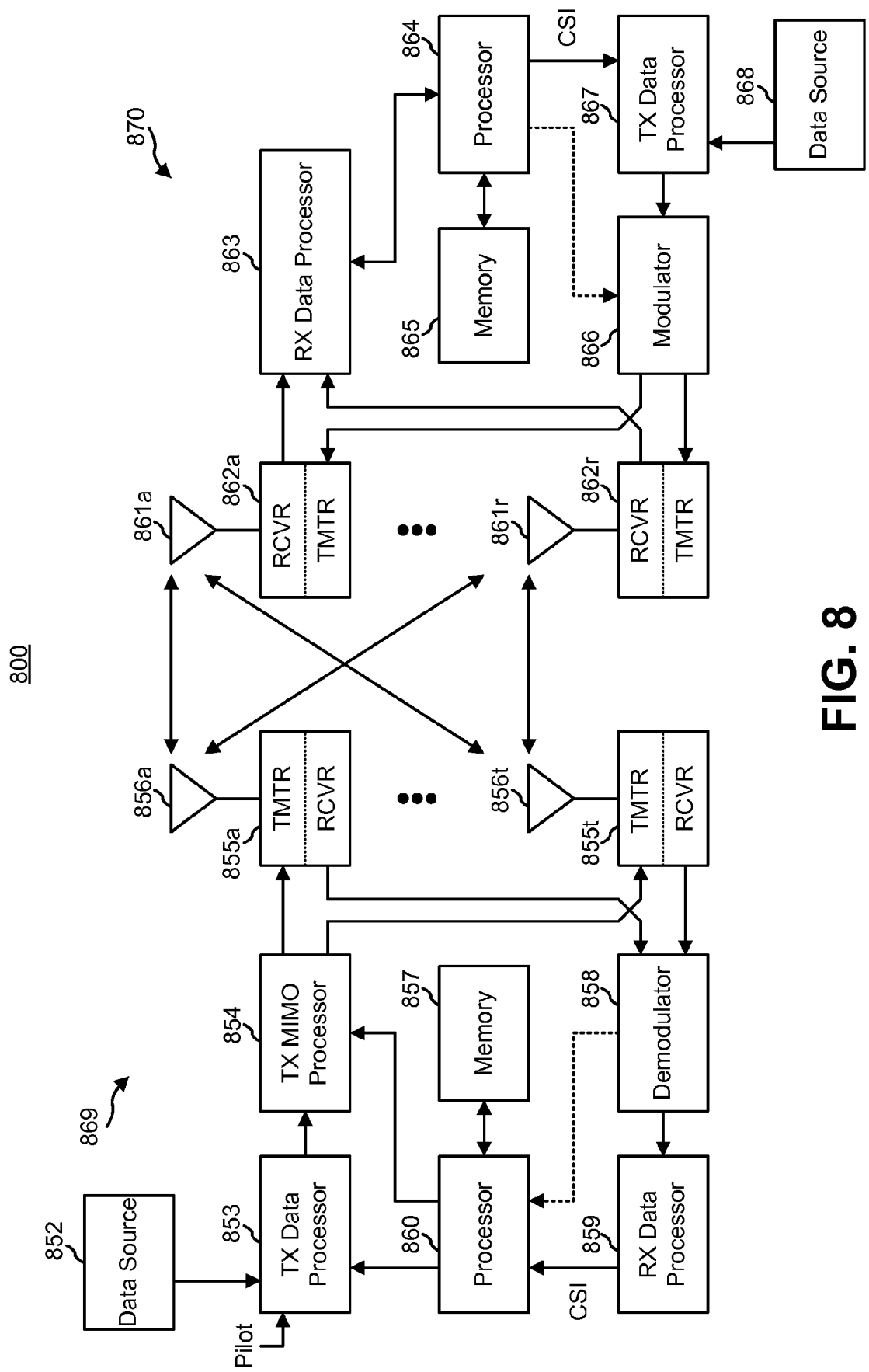
FIG. 8 is a block diagram of a transmitter and receiver in a multiple-input and multiple-output (MIMO) system.

FIG. 8 is a block diagram of a transmitter 869 and receiver 870 in a multiple-input and multiple-output (MIMO) system 800. In the transmitter 869, traffic data for a number of data streams is provided from a data source 852 to a transmit (TX) data processor 853. Each data stream may then be transmitted over a respective transmit antenna 856a-t. The transmit (TX) data processor 853 may format, code, and interleave the traffic data for each data stream based on a particular coding scheme selected for that data stream to provide coded data.

The coded data for each data stream may be multiplexed with pilot data using OFDM techniques. The pilot data may be a known data pattern that is processed in a known manner and used at the receiver 870 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processor 854, which may further process the modulation symbols (e.g., for OFDM). The transmit (TX) multiple-input multiple-output (MIMO) processor 854 then provides NT modulation symbol streams to NT transmitters (TMTR) 855a through 855t. The TX transmit (TX) multiple-input multiple-output (MIMO) processor 854 may apply beamforming weights to the symbols of the data streams and to the antenna 856 from which the symbol is being transmitted.

Each transmitter 855 may receive and process a respective symbol stream to provide one or more analog signals, and further condition (e.g., amplify, filter, and upconvert) the analog signals to provide a modulated signal suitable for transmission over the MIMO channel. NT modulated signals from transmitters 855a through 855t are then transmitted from NT antennas 856a through 856t, respectively.

At the receiver 870, the transmitted modulated signals are received by NR antennas 861a through 861r and the received signal from each antenna 861 is provided to a respective receiver (RCVR) 862a through 862r. Each receiver 862 may condition (e.g., filter, amplify, and downconvert) a respective received signal, digitize the conditioned signal to provide samples, and further process the samples to provide a corresponding "received" symbol stream.

An RX data processor 863 then receives and processes the NR received symbol streams from NR receivers 862 based on a particular receiver processing technique to provide NT "detected" symbol streams. The RX data processor 863 then demodulates, deinterleaves and decodes each detected symbol stream to recover the traffic data for the data stream. The processing by RX data processor 863 is complementary to that performed by TX MIMO processor 854 and TX data processor 853 at transmitter system 869.

A processor 864 may periodically determine which precoding matrix to use. The processor 864 may store information on and retrieve information from memory 865. The processor 864 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 867, which also receives traffic data for a number of data streams from a data source 868, modulated by a modulator 866, conditioned by transmitters 862a through 862r, and transmitted back to the transmitter 869.

At the transmitter 869, the modulated signals from the receiver are received by antennas 856, conditioned by receivers 855, demodulated by a demodulator 858, and processed by an RX data processor 859 to extract the reverse link message transmitted by the receiver system 870. A processor 860 may receive channel state information (CSI) from the RX data processor 859. The processor 860 may store information on and retrieve information from memory 857. The processor 860 then determines which pre-coding matrix to use for determining the beamforming weights and then processes the extracted message.

Figure 9:
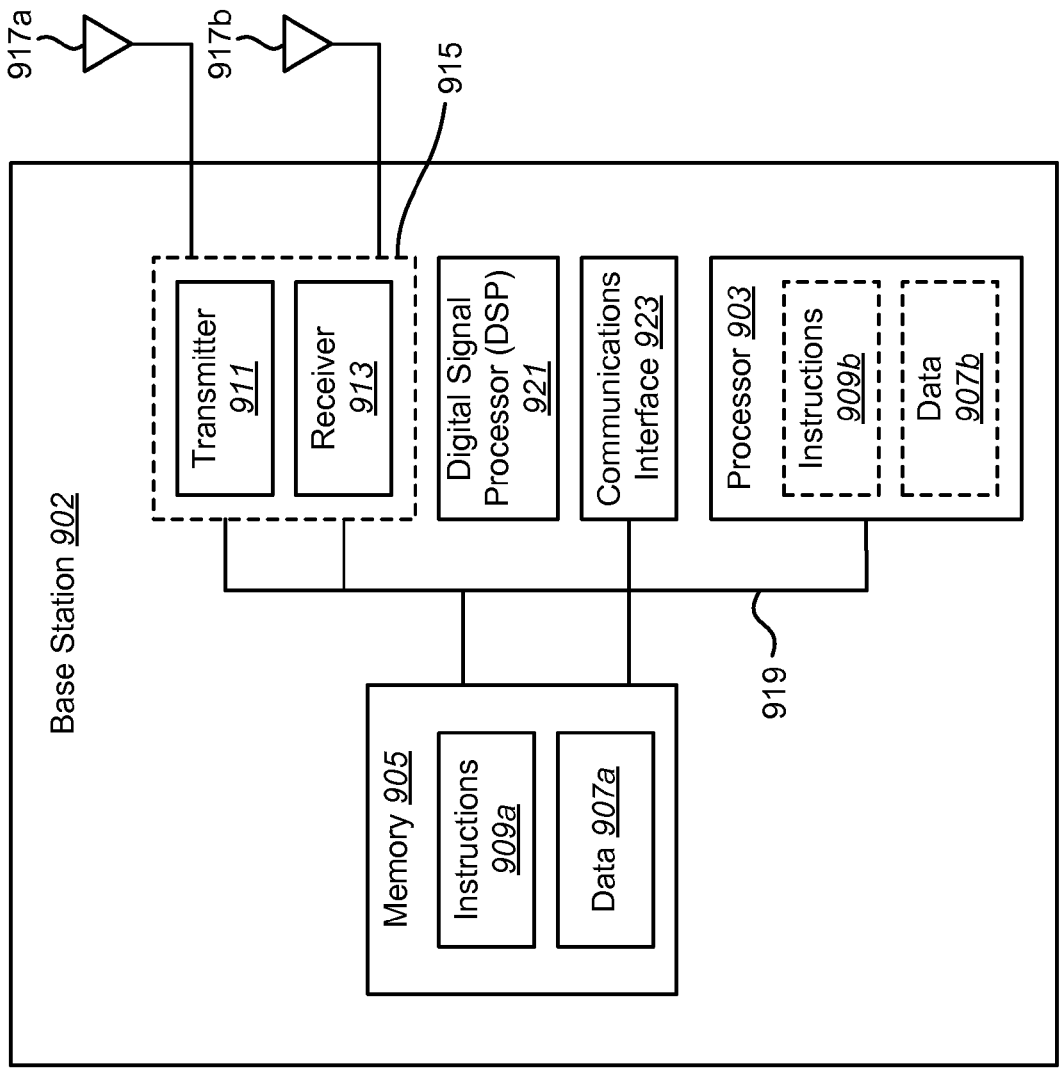
FIG. 9 illustrates certain components that may be included within a base station.

FIG. 9 illustrates certain components that may be included within a base station 902. A base station may also be referred to as, and may include some or all of the functionality of, an access point, a broadcast transmitter, a NodeB, an evolved NodeB, etc. The base station 902 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the base station 902 of FIG. 9, in an alternative configuration, a combination of processors (e.g., an ARM and DSP) could be used.

The base station 902 also includes memory 905. The memory 905 may be any electronic component capable of storing electronic information. The memory 905 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909a, various portions of the instructions 909b may be loaded onto the processor 903, and various pieces of data 907b may be loaded onto the processor 903.

The base station 902 may also include a transmitter 911 and a receiver 913 to allow transmission and reception of signals to and from the base station 902. The transmitter 911 and receiver 913 may be collectively referred to as a transceiver 915. Multiple antennas 917a-b may be electrically coupled to the transceiver 915. The base station 902 may also include (not shown) multiple transmitters, multiple receivers, multiple transceivers and/or additional antennas.

The base station 902 may include a digital signal processor (DSP) 921. The base station 902 may also include a communications interface 923. The communications interface 923 may allow a user to interact with the base station 902.

The various components of the base station 902 may be coupled together by one or more buses, which may include a power bus, a control signal bus, a status signal bus, a data bus, etc. For the sake of clarity, the various buses are illustrated in FIG. 9 as a bus system 919.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3 and 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for providing multiple-user multiple-input and multiple-output in a high-speed packet access system, comprising:
   receiving channel quality indicators from a plurality of dual stream capable wireless communication devices;
   determining a preferred beam and a secondary beam for each wireless communication device using the channel quality indicators;

pairing wireless communication devices with preferred beams orthogonal to each other;
selecting a wireless communication device pair; and
scheduling data streams for the selected wireless communication device pair in the same transmission time interval using an orthogonal variable spreading factor code.

2. The method of claim 1, wherein the wireless communication devices are user equipment.

3. The method of claim 1, wherein the method is performed by a Node B.

4. The method of claim 3, wherein pairing the wireless communication devices comprises comparing the preferred beams of each wireless communication device served by the Node B.

5. The method of claim 1, wherein the wireless communication device pair comprises a first wireless communication device and a second wireless communication device, and wherein scheduling data streams for the selected wireless communication device pair comprises scheduling a first data stream on the preferred beam of the first wireless communication device and scheduling a second data stream on the preferred beam of the second wireless communication device.

6. The method of claim 5, wherein the first data stream and the second data stream are transmitted simultaneously.

7. The method of claim 1, wherein the orthogonal variable spreading factor code has a spreading factor of sixteen.

8. The method of claim 1, wherein the method is performed for each transmission time interval.

9. The method of claim 1, wherein pairing wireless communication devices with preferred beams orthogonal to each other comprises using a comparison table.

10. The method of claim 1, wherein selecting a wireless communication device pair comprises selecting the wireless communication device pair from a plurality of wireless communication device pairs, and wherein the selected wireless communication device pair maximizes a metric during the transmission time interval.

11. A wireless device configured for providing multiple-user multiple-input and multiple-output in a high-speed packet access system, comprising:
a processor;
memory in electronic communication with the processor;
instructions stored in the memory, the instructions being executable by the processor to:
receive channel quality indicators from a plurality of dual stream capable wireless communication devices;
determine a preferred beam and a secondary beam for each wireless communication device using the channel quality indicators;
pair wireless communication devices with preferred beams orthogonal to each other;
select a wireless communication device pair; and
schedule data streams for the selected wireless communication device pair in the same transmission time interval using an orthogonal variable spreading factor code.

12. The wireless device of claim 11, wherein the wireless communication devices are user equipment.

13. The wireless device of claim 11, wherein the wireless device is a Node B.

14. The wireless device of claim 13, wherein pairing the wireless communication devices comprises comparing the preferred beams of each wireless communication device served by the Node B.

15. The wireless device of claim 11, wherein the wireless communication device pair comprises a first wireless communication device and a second wireless communication device, and wherein scheduling data streams for the selected wireless communication device pair comprises scheduling a first data stream on the preferred beam of the first wireless communication device and scheduling a second data stream on the preferred beam of the second wireless communication device.

16. The wireless device of claim 15, wherein the first data stream and the second data stream are transmitted simultaneously.

17. The wireless device of claim 11, wherein the orthogonal variable spreading factor code has a spreading factor of sixteen.

18. The wireless device of claim 11, wherein the instructions are executable by the processor for each transmission time interval.

19. The wireless device of claim 11, wherein pairing wireless communication devices with preferred beams orthogonal to each other comprises using a comparison table.

20. The wireless device of claim 11, wherein selecting a wireless communication device pair comprises selecting the wireless communication device pair from a plurality of wireless communication device pairs, and wherein the selected wireless communication device pair maximizes a metric during the transmission time interval.

21. A wireless device configured for providing multiple-user multiple-input and multiple-output in a high-speed packet access system, comprising:
means for receiving channel quality indicators from a plurality of dual stream capable wireless communication devices;
means for determining a preferred beam and a secondary beam for each wireless communication device using the channel quality indicators;
means for pairing wireless communication devices with preferred beams orthogonal to each other;
means for selecting a wireless communication device pair; and
means for scheduling data streams for the selected wireless communication device pair in the same transmission time interval using an orthogonal variable spreading factor code.

22. The wireless device of claim 21, wherein pairing the wireless communication devices comprises comparing the preferred beams of each wireless communication device served by the wireless device.

23. The wireless device of claim 21, wherein the wireless communication device pair comprises a first wireless communication device and a second wireless communication device, and wherein scheduling data streams for the selected wireless communication device pair comprises scheduling a first data stream on the preferred beam of the first wireless communication device and scheduling a second data stream on the preferred beam of the second wireless communication device.

24. The wireless device of claim 23, wherein the first data stream and the second data stream are transmitted simultaneously.

25. The wireless device of claim 21, wherein the orthogonal variable spreading factor code has a spreading factor of sixteen.

26. A computer-program product for providing multiple-user multiple-input and multiple-output in a high-speed packet access system, the computer-program product comprising a non-transitory computer-readable medium having instructions thereon, the instructions comprising:

code for causing a base station to receive channel quality indicators from a plurality of dual stream capable wireless communication devices;

code for causing the base station to determine a preferred beam and a secondary beam for each wireless communication device using the channel quality indicators;

code for causing the base station to pair the wireless communication devices with preferred beams orthogonal to each other;

code for causing the base station to select a wireless communication device pair; and code for causing the base station to schedule data streams for the selected wireless communication device pair in the same transmission time interval using an orthogonal variable spreading factor code.

27. The computer-program product of claim 26, wherein code for causing the base station to pair the wireless communication devices comprises code for causing the base station to compare the preferred beams of each wireless communication device served by the base station.

28. The computer-program product of claim 26, wherein the wireless communication device pair comprises a first wireless communication device and a second wireless communication device, and wherein the code for causing the base station to schedule data streams for the selected wireless communication device pair comprises code for causing the base station to schedule a first data stream on the preferred beam of the first wireless communication device and code for causing the base station to schedule a second data stream on the preferred beam of the second wireless communication device.

29. The computer-program product of claim 28, wherein the first data stream and the second data stream are transmitted simultaneously.

30. The computer-program product of claim 26, wherein the orthogonal variable spreading factor code has a spreading factor of sixteen.

* * * * *